(12) United States Patent
Kanade et al.

(10) Patent No.: US 7,106,361 B2
(45) Date of Patent: Sep. 12, 2006

(54) SYSTEM AND METHOD FOR MANIPULATING THE POINT OF INTEREST IN A SEQUENCE OF IMAGES

(75) Inventors: Takeo Kanade, Pittsburgh, PA (US); Robert Collins, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 396 days.

(21) Appl. No.: 10/074,313

(22) Filed: Feb. 12, 2002

(65) Prior Publication Data

US 2002/0145660 A1 Oct. 10, 2002

Related U.S. Application Data

(60) Provisional application No. 60/268,205, filed on Feb. 12, 2001, provisional application No. 60/268,206, filed on Feb. 12, 2001.

(51) Int. Cl.
*H04N 7/18* (2006.01)
(52) U.S. Cl. .................... 348/159; 348/143; 348/157
(58) Field of Classification Search ............ 348/36–37, 348/135, 139, 141–143, 151–159, 169–172, 348/218.1
See application file for complete search history.

(56) References Cited

U.S. PATENT DOCUMENTS

| | | | |
|---|---|---|---|
| 5,164,827 A | | 11/1992 | Paff |
| 5,489,886 A | * | 2/1996 | Wexler et al. .......... 340/323 R |
| 5,714,997 A | * | 2/1998 | Anderson ..................... 348/39 |
| 5,912,700 A | * | 6/1999 | Honey et al. ................ 348/157 |
| 5,917,937 A | | 6/1999 | Szeliski et al. |
| 6,005,610 A | | 12/1999 | Pingali |
| 6,084,979 A | | 7/2000 | Kanada et al. |
| 6,094,198 A | * | 7/2000 | Shashua ..................... 345/419 |
| 6,100,925 A | * | 8/2000 | Rosser et al. ............... 348/169 |
| 6,137,491 A | | 10/2000 | Szeliski |
| 6,157,747 A | * | 12/2000 | Szeliski et al. ............. 382/284 |
| 6,259,853 B1 | * | 7/2001 | Chen et al. ................. 385/141 |
| 6,608,923 B1 | * | 8/2003 | Zhang et al. ............... 382/154 |
| 6,674,461 B1 | * | 1/2004 | Klapman ..................... 348/42 |
| 2001/0028399 A1 | * | 10/2001 | Conley ....................... 348/239 |
| 2001/0052131 A1 | | 12/2001 | Hobson et al. |
| 2002/0030741 A1 | | 3/2002 | Broemmelsiek |
| 2002/0118286 A1 | | 8/2002 | Kanade et al. |

(Continued)

FOREIGN PATENT DOCUMENTS

EP 0 529 317 A1 3/1993

(Continued)

OTHER PUBLICATIONS

Spice, Byron: "CMU experts helping CBS's 30 robotic cameras to work as one", Pittsburgh Post-Gazette, Jan. 24, 2001, Pittsburgh, PA, USA.

(Continued)

*Primary Examiner*—Mehrdad Dastouri
*Assistant Examiner*—Dave Czekaj
(74) *Attorney, Agent, or Firm*—Kirkpatrick & Lockhart Nicholson Graham LLP

(57) ABSTRACT

A method and a system of generating a video image sequence. According to one embodiment, the method includes positioning a plurality of camera systems relative to a scene such that the camera systems define a gross trajectory. The method further includes transforming images from the camera systems to superimpose a secondary induced motion on the gross trajectory. And the method includes displaying the transformed images in sequence corresponding to the position of the corresponding camera systems along the gross trajectory.

49 Claims, 9 Drawing Sheets

U.S. PATENT DOCUMENTS

| | | |
|---|---|---|
| 2002/0118969 A1 | 8/2002 | Kanade et al. |
| 2003/0076413 A1 | 4/2003 | Kanade et al. |
| 2003/0210329 A1 | 11/2003 | Aagaard et al. |

FOREIGN PATENT DOCUMENTS

| | | |
|---|---|---|
| WO | WO 99 52288 A | 10/1999 |
| WO | WO 02/11431 A1 | 2/2002 |
| WO | WO 02 087218 A | 10/2002 |
| WO | WO 02 096096 A | 11/2002 |

OTHER PUBLICATIONS

Grotticelli, Michael: "CBS Sports eyes Final Four", Broadcasting & Cable, No. 13, Mar. 26, 2001, North Hollywood, CA, USA. (www.broadcastingcable.com/index.asp?layout=print_page&articleID=CA67817).

Saito, H., et al.: "Appearance-Based Virtual View Generation of Temporally-Varying Events from Multi-Camera Images in the 3D Room", 3-D Digital Imaging & Modeling, 1999 Proceedings. Second International Conference in Ottawa, Ont., Canada. Oct. 4-8, 1999, Los Alamitos, CA, USA. IEEE COMPUT. SOC, US. Oct. 4, 1999 pp. 516-525.

Kanade, T. et al.: "Virtualized Reality: Constructing Virtual Worlds From Real Scenes" IEEE Multimedia, Jan.-Mar. 1997, IEEE, USA, vol. 4, No. 1, pp. 34-47.

Narayanan, PJ et al.: "Constructing Virtual Worlds Using Dense Stereo" 6th International Conference On Computer Vision. ICCV '98, Bombay, Jan. 4-7, 1998, pp. 3-10.

Tsai R Y: "A Versatile Camera Calibration Technique For High-Accuracy 3D Machine Vision Metrology Using Off-The-Shelf TV Cameras and Lenses," IEEE Journal of Robotics and Automation, IEEE Inc. New York, US, vol. RA-3, No. 4, Aug. 1987, pp. 323-344.

Vedula S et al.: "Modeling, combining and rendering dynamic real-world events from image sequences," VSMM98. 4th International Conference On Virtual Systems and Multimedia, 1998, pp. 326-332.

* cited by examiner

SYSTEM AND METHOD FOR MANIPULATING THE POINT OF INTEREST IN A SEQUENCE OF IMAGES

CROSS-REFERENCE TO RELATED APPLICATIONS

This application claims priority under 35 U.S.C. § 119 to U.S. provisional patent applications Ser. No. 60/268,205 and Ser. No. 60/268,206, both filed Feb. 12, 2001, which are incorporated herein by reference.

BACKGROUND OF THE INVENTION

1. Field of the Invention

The present invention relates generally to image and video processing.

2. Description of the Background

For applications such as advertising, sports and entertainment, it is often desirable to take a set of images of an object from a large number of cameras that surround the object, and then play back those images in sequence to create an effect as if one is flying around the object. This special effect is sometimes referred to as the "fly-around" effect. A subset of the fly-around effect is when the displayed images are all from the same instant in time; this is sometimes referred to as the "3D stop-motion" effect. If the cameras are positioned in a closed-ended configuration, such as a circle or ellipse, the effect is sometimes referred to as the "spin-image" effect.

FIG. 1 illustrates one known technique for realizing this effect. As illustrated in FIG. 1, multiple cameras are set up in a ring, fixated on a single point of interest (PO) in space. Playing back one frame from each camera creates the appearance of spinning around the POI. Furthermore, playing back frames from a single time step, across all cameras, yields the appearance of freezing the action in time while a virtual camera spins around the frozen actor.

The process of taking images for this purpose is tedious and costly. First, all cameras must be aligned with great precision so that their central viewing rays pass through the same POI on the object. Otherwise, the set of images when played back will appear bumpy and jittery. In addition, after the set of images are taken, one may want to alter the POI around which to create the fly-around effect. This typically involves reorienting the cameras and retaking a whole new set of images. These two difficulties are compounded when dealing with an unsupervised moving object or a dynamic scene (rather than an actor following instructions). There may not be time to align all of the cameras to satisfy the condition that all central rays intersect at the POI, and the object motion may not occur again in the same place. It may also not be possible to align some of the cameras with the POI due to constraints on their allowed motions.

BRIEF SUMMARY OF THE INVENTION

In one general respect, the present invention is directed to a method of generating a video image sequence. According to one embodiment, the method includes positioning a plurality of camera systems relative to a scene such that the camera systems define a gross trajectory. The method further includes transforming images from the camera systems to superimpose a secondary induced motion on the gross trajectory. And the method includes displaying the transformed images in sequence corresponding to the position of the corresponding camera systems along the gross trajectory.

In another general respect, the present invention is directed to a system for generating a video image sequence of an object within a scene. According to one embodiment, the system includes a plurality of camera systems positioned relative to the scene such that the camera systems define a gross trajectory and a video storage unit in communication with the camera systems. The system also includes a frame-sequencing module in communication with the video storage unit. The frame-sequencing module is for transforming images of the camera systems retrieved from the video storage unit to superimpose a secondary induced motion on the gross trajectory. According to another embodiment, the system may also include means for controlling the plurality of camera systems such that the camera systems are simultaneously aimed a target within the scene and a size of the target in the images from the camera systems is substantially the same over time.

In another general respect, the present invention is directed to a computer readable medium. The computer readable medium has stored thereon instructions which, when executed by a processor, cause the processor to transform images from a plurality of camera systems positioned relative to a scene to define a gross trajectory to superimpose a secondary induced motion on the gross trajectory, and to output the transformed images in sequence corresponding to the position of the corresponding camera systems along the gross trajectory.

DESCRIPTION OF THE FIGURES

Embodiments of the present invention are described in conjunction with the following figures, wherein.

DETAILED DESCRIPTION OF THE INVENTION

In one general respect, the present invention concerns a technique for generating virtual camera trajectories and motions from the available camera views. The term "virtual" refers to giving the viewer the appearance that he is looking at video from a single camera that is moving through the scene even though there is no such camera. In particular, the technique concerns generating gross virtual camera trajectories with superimposed secondary induced motions that change the point in the scene at which the virtual camera appears to be looking.

According to one embodiment, the technique includes taking video from a set of cameras arranged relative to (such as surrounding) a dynamic, 3D scene, and to generate a new video corresponding to a smooth, virtual camera trajectory. Two processes may be used to achieve this result. The first includes specification of the gross camera trajectory by selecting a sequence of neighboring physical cameras. Second, image transformations may be applied to video frames from these cameras to superimpose a secondary set of local camera motions on top of this trajectory, resulting in a video sequence that appears to have been taken from a camera undergoing smooth, continuous motion around the scene.

Figure 1:
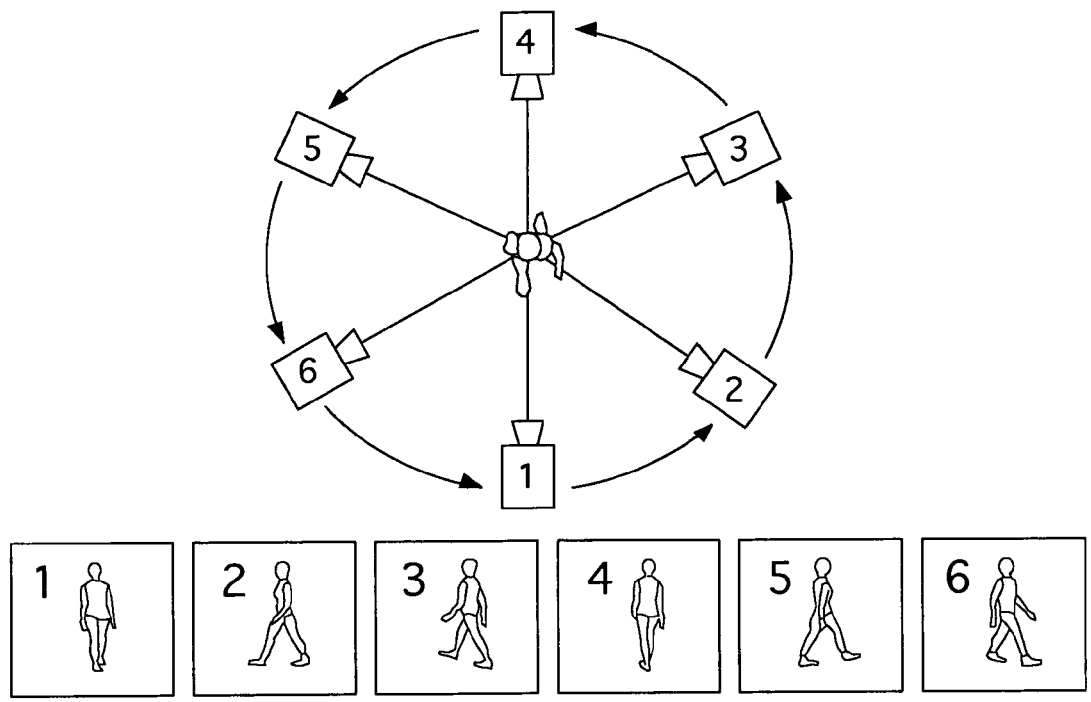
FIG. 1 is a diagram illustrating a technique for achieving the so-called "fly-around" effect.
Figure 2:
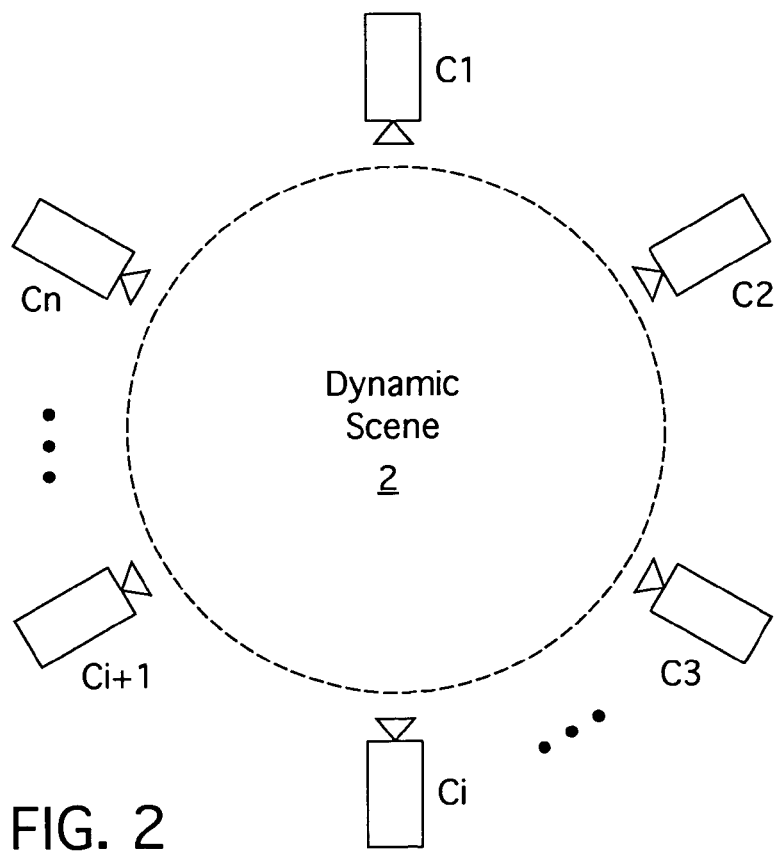
FIG. 2 is a diagram illustrating a number of cameras arranged around a scene.

The gross trajectory aspect of the technique is described in conjunction with FIG. 2. As illustrated in FIG. 2, a set of cameras C1, C2, . . . Cn are arranged around a dynamic scene 2. The cameras C1 . . . Cn may be, for example, static cameras or pan/tilt cameras. The cameras C1 . . . Cn may also have motorized zoom lenses that provide remote control of the field of view (zoom) and depth of field (focus).

Video from each camera C1 . . . Cn may be composed of a set of video frames or images. Let image (j,t) denote the video frame from camera Cj that is taken at time t. To facilitate the cameras C1 . . . Cn taking images at the same instances in time, the cameras may be provided a common genlock signal such that images indexed by time t are synchronized across all cameras to be taken at precisely the same time instant, i.e., t is a common temporal index into all camera videos.

All the cameras C1 . . . Cn may be controlled to take video of interesting events that are visible to them, as described in more detail herein. This may involve active, remote control of their individual pan (P), tilt (T), zoom (Z) and focus (F) parameters in order to keep the desired object within their collective field of view. All of the video may be captured in a video storage device, as described in more detail hereinafter, in such a way that individual image frames I(j,t) can be efficiently retrieved either by camera number j (spatial retrieval) or by time step t (temporal retrieval).

Figure 3:
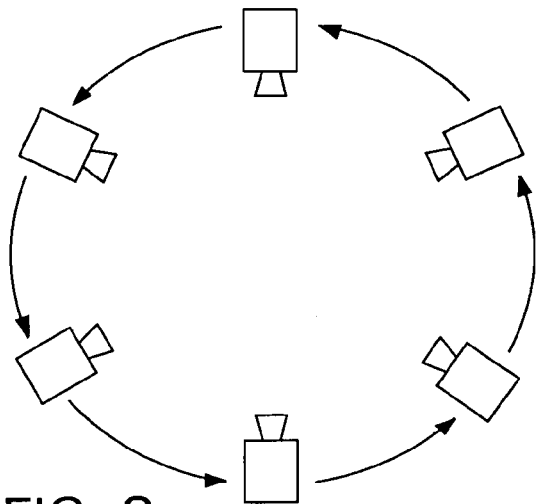
FIG. 3 is a diagram illustrating the spatial "neighbor" relations for a closed-ended configuration of cameras.
Figure 4:
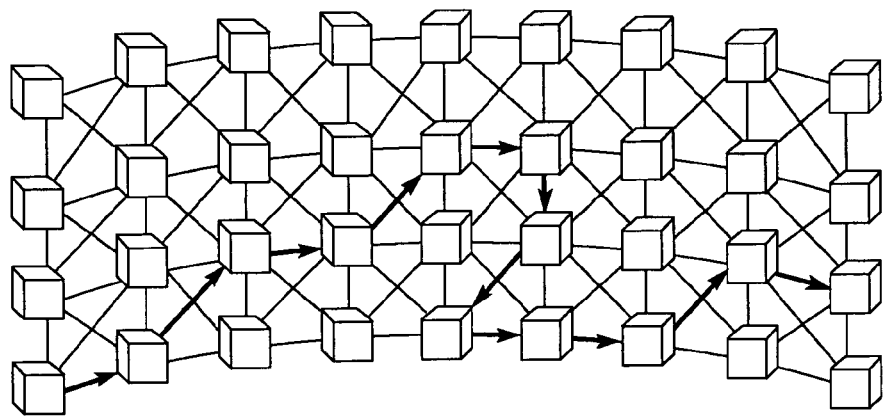
FIG. 4 is a diagram illustrating the spatial "neighbor" relations for an array configuration of cameras.

A neighborhood topology may be defined across all the cameras C1 . . . Cn encoding the notion of which cameras are spatial "neighbors." This topology may be represented as a graph where cameras are nodes and "neighbor" relations are links between nodes, as illustrated in FIGS. 3 and 4. FIG. 3 shows the spatial neighbor relationship for a ring of cameras, and FIG. 4 shows the spatial neighbor relationship for an array of cameras. In FIG. 4, spatial neighbors are shown with thin lines and the thick arrows represent sample trajectories.

A trajectory may be defined as a sequence of M camera indices (j(1), j(2), . . . , j(M)) defining a sequence of cameras (Cj(1), Cj(2), . . . Cj(M)) such that adjacent cameras are neighbors, i.e., there is a link between node Cj(k) and Cj(k+1) in the neighborhood topology graph. A trajectory may be cyclic, in which case Cj(M) and Cj(1) are neighbors.

By playing back a sequence of frames I(j, t(k)) with constant camera index j and a sequence of times t(k) such that $t_{start} \leq k \leq t_{end}$, a standard video subsequence can be created from a particular camera.

By playing back a sequence of frames I (j(k), t) for a sequence of neighboring cameras with $k_{start} \leq k \leq k_{end}$, and for a constant t, a "freeze-frame" or "stop-motion" video can be created that shows a frozen moment in time viewed from what appears to be a camera moving spatially through the scene. The trajectory may appear to be jumpy, depending upon the precision of the alignment of the cameras and the positioning of the cameras along the sequence trajectory.

By playing back a sequence of frames I(j(k), t(p)) for a sequence of neighboring cameras with $k_{start} \leq k \leq k_{end}$, and for a sequence of time t(p) with $t_{start} \leq p \leq t_{end}$, a video showing moving events may be created, viewed from what appears to be a camera moving spatially through the scene. Again, the trajectory may appear to be jumpy due to camera misalignment and/or camera positioning (such as whether the cameras are evenly spaced along the trajectory).

Figure 5:
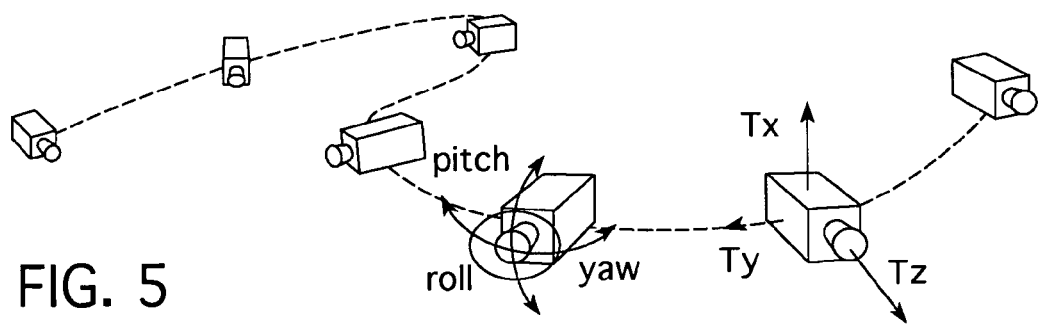
FIG. 5 is a diagram illustrating a set of local camera motions superimposed on top of a gross camera trajectory.

The secondary induced motion aspect of the technique is described in conjunction with FIG. 5. As discussed previously, this aspect involves a superimposition of secondary, local camera motions on top of the gross trajectory. Local camera motion may be parameterized by six parameters. The three degrees of camera rotation may be specified by pitch, roll and yaw, and the three degrees of camera translation may be specified by displacement Tx, Ty and Tz, where Tz is directed along the central viewing ray of the camera, and Tx and Ty are perpendicular to the central viewing ray in the x and y directions respectively.

These local motions may be induced by purely 2D image transformations that require no knowledge of the 3D scene structure. In general, each transformation may be represented as a 2D homography, i.e., a 3×3 transformation matrix in homogenous 2D film plane coordinates. In some cases the homography reduces either exactly or approximately to simpler image plane transforms such as similarity transformation (translation, rotation and scale), translation only, and scale only. These cases may be important if fast implementations are desired, such as to reduce the processing time needed to create a video sequence after an event has completed.

Several goals are achievable by applying 2D transforms that simulate local camera motions. As a first example, misalignment errors between multiple cameras can be corrected so that they appear to fixate precisely on a given POI in the video sequence, even though they did not all point at a single 3D point in the scene. A second example is that new points of interest may be chosen for camera fixation, even though they were not anticipated during recording of the event. Third, additional frames can be generated between actual image frames from a sparse set of cameras along the gross trajectory, thereby transforming a jumpy video sequence into one that appears to be smooth and continuous.

Provided below are some aspects of the secondary induced motion aspect of the technique. Mathematical justification for each of these points is included in the Appendix attached hereto. In the Appendix, mathematical justification for the first point listed below is provided at the heading denoted A1, mathematical justification for the second point is provided at A2, and so on.

First, camera rotation induces a 2D homography in the image frame. As a result, small corrections and adjustments of camera rotation may be performed after-the-fact, purely by applying a 2D image transformation to each video frame in a sequence.

Second, change in camera zoom induces an isotropic scaling of the image frame. As a result, corrections or adjustments of camera zoom may be performed after-the-fact, purely by applying a 2D image transformation to each video frame in a sequence.

Third, a small translation along the camera's central viewing ray approximately induces an isotropic scaling in the image frame. Particularly, this is a good approximation when an object being fixated on is "shallow" in depth, i.e., the range of z values across the object is small with respect to the mean distance z from the camera.

Fourth, a small translation perpendicular to the camera's central viewing ray is approximately a 2D image translation. As in the prior statement, this approximation may be appropriate when fixating on "shallow" objects.

Fifth, 2D image transformations corresponding to multiple changes of camera rotation or translation can be composed into a single, new 2D transformation.

Sixth, small, local changes in camera rotation and translation can be parameterized by six parameters: pitch, roll, and yaw angles for rotation, and Tx, Ty and Tz displacements perpendicular (Tx and Ty) and parallel (Tz) to the camera's central viewing ray.

Seven, corrections or adjustments to camera yaw and pitch can be specified by selecting one point correspondence, called the point of interest (POI). This defines a homography that brings the POI to the center of the image by simulating the effects of changing yaw and pitch.

Eight, for cameras at high zoom viewing distant objects, the yaw and pitch homography of the prior statement can be approximated as the 2D image translation.

Nine, corrections or adjustments to yaw, pitch, roll and Tz can be specified by selecting two point correspondences, a point of interest (POI) and a vertical unit point V1. These define a homography that may, for example, bring the POI to the center of the image and map V1 one unit vertically above the center of the image, by simulating the effects of changing yaw, pitch, roll and translation Tz along the camera's central viewing ray. Other vertical unit points may be defined instead such as, for example, two vertical unit points above, one vertical unit point below, etc.

Ten, for cameras at high zoom viewing distant objects, the yaw, pitch, roll and Tz homography of the prior statement can be approximated as the 2D similarity transformation, i.e., an image translation, rotation and isotropic scale.

Eleven, corrections or adjustments to yaw, pitch, roll, Tx, Ty and Tz can be specified by selecting a three point correspondence, a point of interest (POI), a vertical unit point V1, and a translation point C0. These define a homography that brings the POI to point C0 and maps V1 one unit vertically above point C0, by simulating the effects of changing yaw, pitch and roll rotation angles, displacements Tx and Ty perpendicularly to the camera's central viewing ray, and displacement Tz along the camera's central viewing ray.

Twelve, for cameras at high zoom viewing distant objects, the yaw, pitch, roll, Tx, Ty and Tz homography statement of the prior statement can be approximate as the 2D similarity transformation, i.e., an image translation, rotation and isotropic scale.

Figure 6:
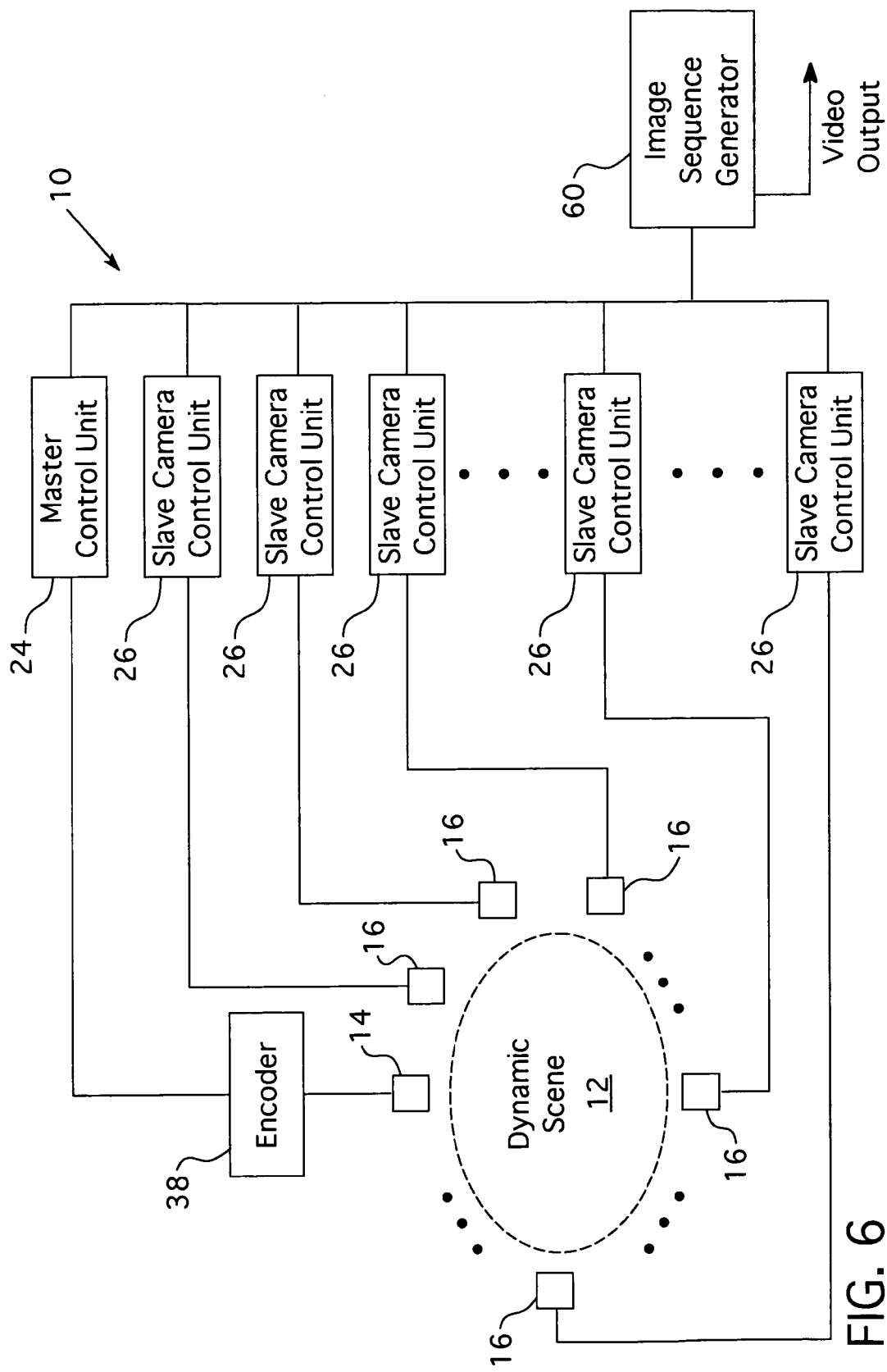
FIGS. 6 and 7 are diagrams of a system for generating a video image sequence of an object within a scene according to one embodiment of the present invention.
Figure 7:
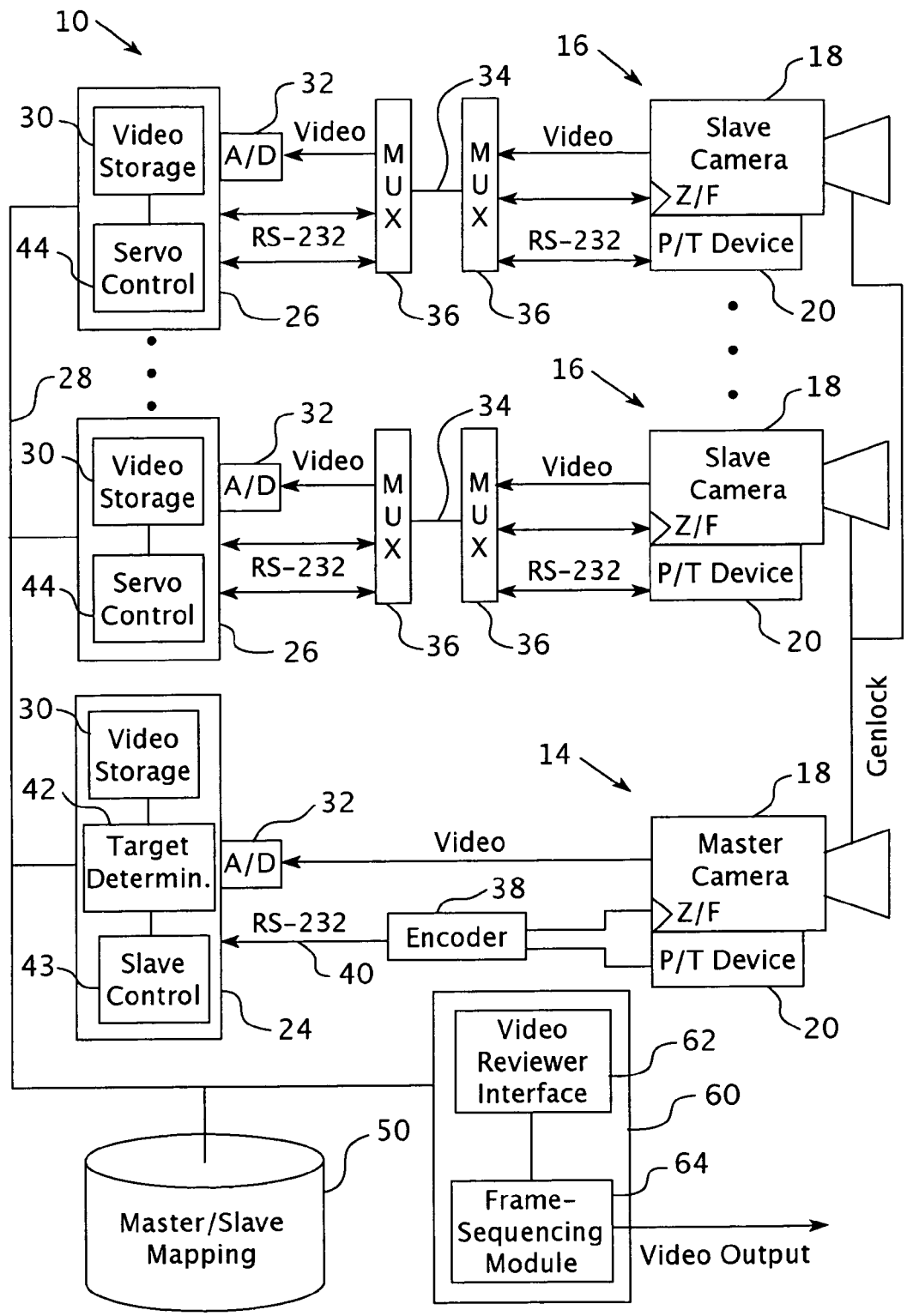

The techniques described herein can be used in many applications. One application is to provide spin-image stabilization in systems designed to generate a "spin-image" video sequence. FIGS. 6 and 7 are block diagrams of a system 10 according to one embodiment. The system 10 includes a number of camera systems positioned around the dynamic scene 12. According to one embodiment, the camera systems may be variable pointing camera systems including a master variable pointing camera system 14 and a number of slave variable camera systems 16. According to one embodiment, the variable pointing camera systems 14, 16 may be, for example, pan/tilt camera systems, as explained further herein. For purposes of convenience in the description to follow, the camera systems 14, 16 are sometimes referred to as pan/tilt camera systems 14, 16, although it should be recognized that the variable pointing camera systems 14, 16 may be any camera system having the ability to point at different targets within the scene 12. In addition, according to another embodiment, as described further herein, the camera systems 14, 16 may be fixed (i.e., nonvariable pointing) camera systems.

The master pan/tilt camera system 14 may include a video camera 18 and a pan/tilt device 20 for panning and tilting the camera 18. Similarly, the slave pan/tilt camera systems 16 may include a video camera 18 and pan/tilt devices 20. The system 10 may include any number of camera systems 14, 16 positioned around the scene, and the quantity of camera systems may be determined based upon the system requirements and applications. According to one embodiment, the camera systems 14, 16 are equally spaced about the scene 12. According to another embodiment, some or all of the camera systems 14, 16 may be static (or fixed) cameras, i.e., cameras 18 with no pan/tilt device 20.

As illustrated in FIGS. 6 and 7, the system 10 additionally includes a master control unit 24 in communication with the master camera system 14. The system 10 also includes a number of slave camera control units 26 in communication with the master control unit 24 by, for example, a computer network 28 such as, for example, a LAN. Each slave camera control unit 26 is for controlling one or more slave camera systems 16. For purposes of simplicity, in FIGS. 6 and 7 each slave camera control unit 26 is shown as being in communication with only one slave camera system 16; however, according to other embodiments, more than one slave camera system 16 may be in communication with one slave camera control unit 26 for the purpose of having that one slave camera control unit 26 control multiple slave camera systems 16.

The master control unit 24 and the slave camera control units 26 may be implemented as computing devices such as, for example, a personal computer, a laptop computer, a workstation, a minicomputer, a mainframe or a supercomputer, depending upon the application requirements. Each of the control units 24, 26 may include a video storage unit 30 for storing digitized, time-stamped video image frames from the respective camera systems 14, 16. The video storage units 30 may be, for example, DAT drives utilizing a Digital Video Data Storage (DVDS) format. For an embodiment where the cameras 18 are not digital video cameras, the system 10 may include analog-to-digital (A/D) converters 32 to convert the analog video from the cameras 18 to a digital format.

The camera systems need not be in close proximity to their respective control units. For example, in FIG. 7 the slave camera systems 16 are shown as being in communication with their respective slave camera control units 26 via a fiber optic cable 34. For such an embodiment, the system 10 may include multiplexers/demultiplexers (MUX) 36 to multiplex and demultiplex the data onto and off of the fiber optic cables 34. In FIG. 7 the master camera system 14 is not illustrated as being in communication with the master control unit via a fiber optic cable, but according to other embodiments these components may be in communication via, for example, a fiber optic cable.

The master camera system 14 may be operated by an operator (not shown), which may be, for example, a human operator or a computer vision system, as described hereinafter. Accordingly, the operator may focus the master camera system 14 on the point of interest (or target) within the scene 12. Parameters of the master camera system 14 are communicated to the master control unit 24. According to one embodiment, the relevant parameters include pointing parameters, such as pan (P) and tilt (T) angles for the pan/tilt devices 20, optical parameters, such as zoom (Z) and focus (F) parameters for the cameras 18, and mechanical parameters, such as speed and accuracy. These parameters may be digitally encoded by an encoder 38 and communicated to the master control unit 24, such as by using a RS232 link 40. For purposes of convenience in the description to follow, the relevant parameters are limited to pan, tilt, zoom and focus, although it should be recognized that other parameters might also be used by the system 10. Also, hereinafter the encoder 38 is sometimes referred to as the PTZF encoder 38.

As illustrated in FIG. 7, the master control unit 24 may also include a target determination module 42 and a slave control module 43. The modules 42, 43 may be implemented as software code to be executed by the master control unit 24 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The target determination module 42 reads the current PTZF parameters received from the master camera system 14. Based on the pan/tilt angles, the target determination module 42 may compute the position of the desired target within the scene 12, and based on the zoom and focus parameters the target determination 42 may compute the size of the target at the position in images from the master camera system 14.

Based on the determined target position and size, the slave control module 43 may compute the desired pan, tilt, zoom and focus parameters for each slave camera system 16. As described further hereinbelow, this calculation may also be dependent on master/slave mapping data, which may be ascertained during a calibration process. The master/slave mapping data may be stored in a network database 50, as illustrated in FIG. 7. According to another embodiment, the master/slave mapping data may be stored in a memory unit (not shown) of the master control unit 24. Once computed by the slave control module 42, the parameters are communicated, via the network 28, to the slave camera control units 26 that control the slave camera systems 16. Commands may be sent from the master control unit 24 to each slave camera control unit 26 at a high update rate in order to be responsive to movements made by the operator of the master camera system 14.

Also, as illustrated in FIG. 7, each slave camera control unit 26 includes a servo control module 44. The servo control modules 44 may be implemented as software code to be executed by the slave camera control units 26 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

Based on the PTZF parameters received from the slave control unit 43, the servo control modules 44 execute a servo control loop to compute commands to control the pan, tilt, zoom and focus of the slave camera systems 16 in order that the slave camera systems 16 may track the same target as the master camera system 14 and with the same focus to smoothly and accurately track the scene position designated by the master camera system 14. The PTZF commands for the slave camera systems 16 may be communicated from the slave camera control units 26 via, for example, the fiber optic cable 34 and RS-232 links. The pan and tilt commands may be input to the pan/tilt device 20 of the slave camera system 16 and the zoom/focus commands may be input to the camera 18 of the slave camera system 16.

Thus, according to one embodiment, based on feedback from the master camera system 14 and knowledge of the geometry of the scene, a 3D servo-fixation point may be chosen, which is the desired target of each camera system 14, 16. Each slave camera system 16 is then directed to view this fixation point. As the operator moves the master camera system 14 in real-time, each slave camera system 16 is controlled to continuously servo on the moving fixation point. The zoom and focus of each slave camera system 16 is also controlled, based on their distance to the desired servo-fixation point.

Also, as illustrated in FIGS. 6 and 7, the system 10 may include an image sequence generator 60 which may, according to one embodiment, be implemented by a computing device such as, for example, a personal computer, a laptop computer, a workstation, a minicomputer, a mainframe or a supercomputer, depending upon the application requirements. The image sequence generator 60 may include a video reviewer interface module 62 and a frame-sequencing module 64. The modules 62, 64 may be implemented as software code to be executed by a processor of the generator 60 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

Video from the master and slave camera systems may be continuously stored in the video storage units 30. As described previously, the video storage units 30 may be such that the video frames are retrievable both spatially and temporally. The video reviewer interface module 62 may be a graphic-based man-machine interface that provides continuous video from at least one of the camera systems 14, 16 to a video review operator and which allows the video review operator to select a point in time in which to create a 3D stop-motion video image sequence of the target. The reviewer interface module 62 may also allow the reviewer to retrieve video frames temporally (i.e., sequential frames in time from a single camera system) or spatially (i.e., the same time frame, retrieved from a sequence of cameras).

The frame-sequencing module 64 may retrieve image frames from the video storage units 30 for certain (i.e., all or less than all) of the camera systems 14, 16 and output images in a sequence corresponding to the position of the corresponding camera systems 14, 16. For example, the frame-sequencing module 64 may output images from each of the camera systems 14, 16 corresponding to the position of the camera systems around the scene 12, either clockwise or counter-clockwise, to generate the fly-around video image sequence. To generate a 3D stop-motion image sequence, each image may be from the same instant in time. For that and similar time-dependent purposes, each camera system 14, 16 may be synchronized to a common genlock signal, so that the shutter for each camera 18 fires at precisely the same time, resulting in video frames taken at the same time instant, thus heightening the apparent stop-motion effect.

Figure 8:
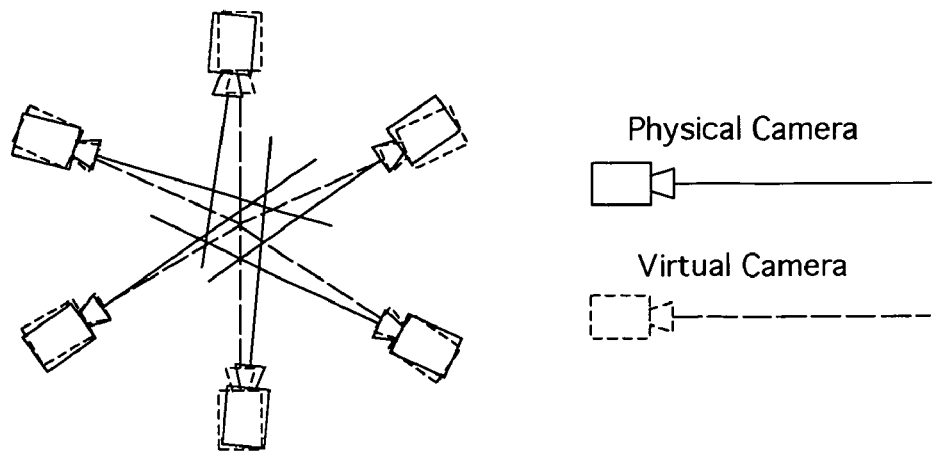
FIG. 8 is a diagram illustrating the concept of correcting for physically misaligned camera systems using an embodiment of the present invention.

For such a system, the gross trajectory is predefined by the cyclic neighborhood topology of the camera systems 14, 16. Accordingly, the frame-sequencing module 64 may provide correction for misalignment of the cameras, as illustrated in FIG. 8, through the secondary, induced camera motion by allowing specification of the point of interest (POI) and vertical unit point V1, as described herein, for each frame of the sequence. The POI and vertical unit point V1 may be specified by an operator, such as through the video reviewer interface 62, by allowing the operator to click on the points with a mouse or stylus, or by entering character strings corresponding to the coordinates of these points in each frame. According to another embodiment, these points may be specified by a software application.

Figure 9:
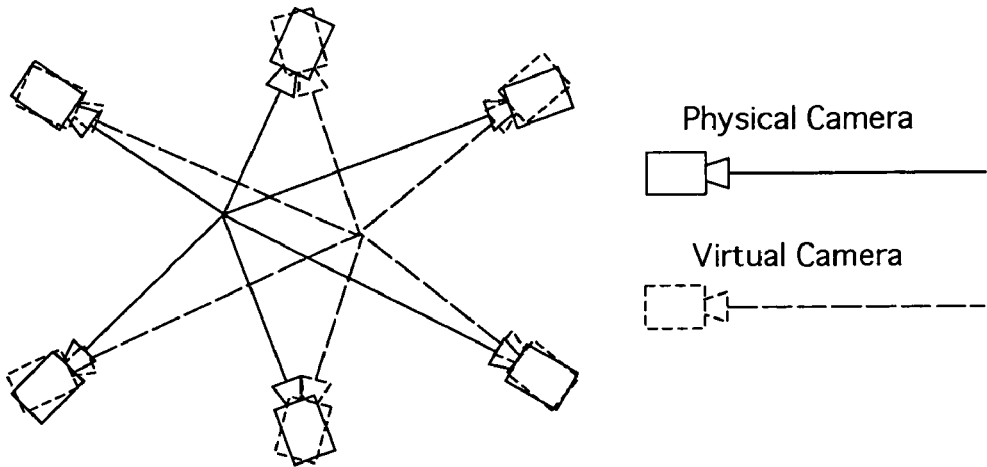
FIG. 9 is a diagram illustrating the concept of changing the point of interest (POI) when the camera systems are fixated on a different point in space according to one embodiment of the present invention.
Figure 9A:
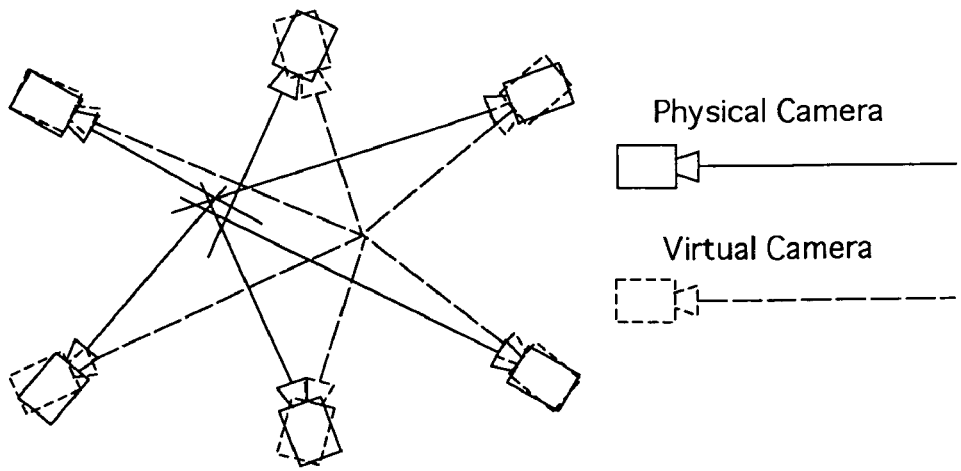
FIG. 9a is a diagram illustrating the concept of changing the point of interest (POI) when the camera systems are aimed on a different point in space, but physically misaligned, according to one embodiment of the present invention.

According to another embodiment, the frame-sequencing module 64 may provide the ability to change the fixation point after the fact (i.e., after the images have been captured) to, for example, focus attention on other objects in the scene. This may be done whether or not the camera systems 14, 16 are perfectly aligned by specification of the POI in each image frame, as illustrated in FIGS. 9 and 9a.

In addition, according to another embodiment, simulating the effects of changing yaw, pitch and roll rotation angles, as well as displacements Tx, Ty, and Tz, in the image sequence may be realizable by the frame-sequencing module 64 through specification of the POI, vertical unit point V1, and translation point C0.

Figure 10:
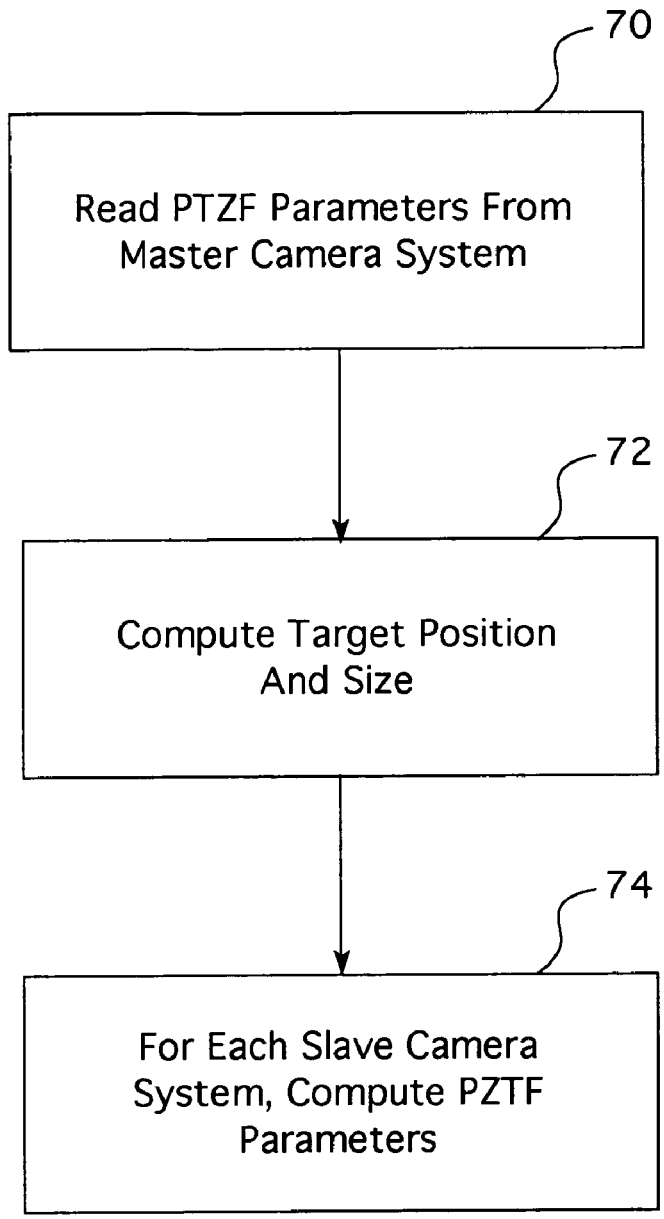
FIG. 10 is a diagram illustrating the process flow through the master control unit of the systems of FIGS. 6 and 7 according to one embodiment of the present invention.

FIG. 10 is a diagram illustrating the process flow through the master control unit 24 according to one embodiment of the present invention. The process initiates at block 70 where the master control unit 24 reads the pan, tilt, zoom and focus (PTZF) parameters of the master camera system 14. Next, at block 72, the target determination module 42 determines the position and size of the target. As described previously, the target determination module 42 may determine the position from the pan and tilt parameters and the size from the zoom and focus parameter. Next, at block 74, the slave control module 43 may compute the PTZF parameters for each of the slave camera systems 16 based on the determined target position and size, and based on the master/slave mapping data as determined in the calibration process.

Before operation of the system 10, each camera system 14, 16 may be calibrated so that its relationship to the scene 12 and to the other camera systems is known. According to one embodiment, this requires determining the pose (i.e., location and orientation) of each camera system 14, 16 with respect to a scene coordinate system, determining the relationship of the zoom control parameter to angular field of view, and determining the relationship of the focus control parameter to the distance of objects in the scene.

Camera pose may be determined by measuring the pan/tilt angles toward a set of distinguished points or "landmarks" with known 3D coordinates. "Sighting" the landmarks involves rotating the pan/tilt device from a user interface, until the landmark point is centered within the field of view of the camera. The pan/tilt parameters are the stored with the X,Y,Z coordinates of the landmark to form one pose calibration measurement.

Camera orientation and location can be determined by an optimization procedure, using three or more landmark measurements in a nondegenerate configuration. For high-precision pointing, it may also be necessary to measure the pitch and yaw of the sensor as mounted on the pan/tilt devices 20, and the offset of the sensor focal point from the center of rotation of the pan/tilt device 20. These values can be measured directly and/or solved for using an optimization procedure based on more than three landmark measurements.

Computer control of motorized zoom lenses may involve sending commands to the camera system containing parameters specifying the desired zoom and focus. The effect of the value of these parameters on physical lens settings may be determined through calibration. The zoom parameter may be calibrated by stepping through the allowable values and measuring the field of view after the motorized zoom is complete. User control of the pan/tilt devices 20 can be used to actively and directly measure the field of view at each setting.

The focus parameter may be calibrated by focusing on objects at different distances from the camera systems 14, 16, and deriving either an explicit or implicit relationship between focus value and distance. For example, an implicit relationship can be determined using a lookup table of focus parameter settings, indexed by inverse distance to the desired focal distance in the scene. Focus to points at intermediate distances can be determined via interpolation of these stored table values.

During system operation, the operator may select any camera system in the system 10 to act as a master camera system 14. According to one embodiment, the operator may change which camera system is the master camera system 14 at any time.

Figure 11:
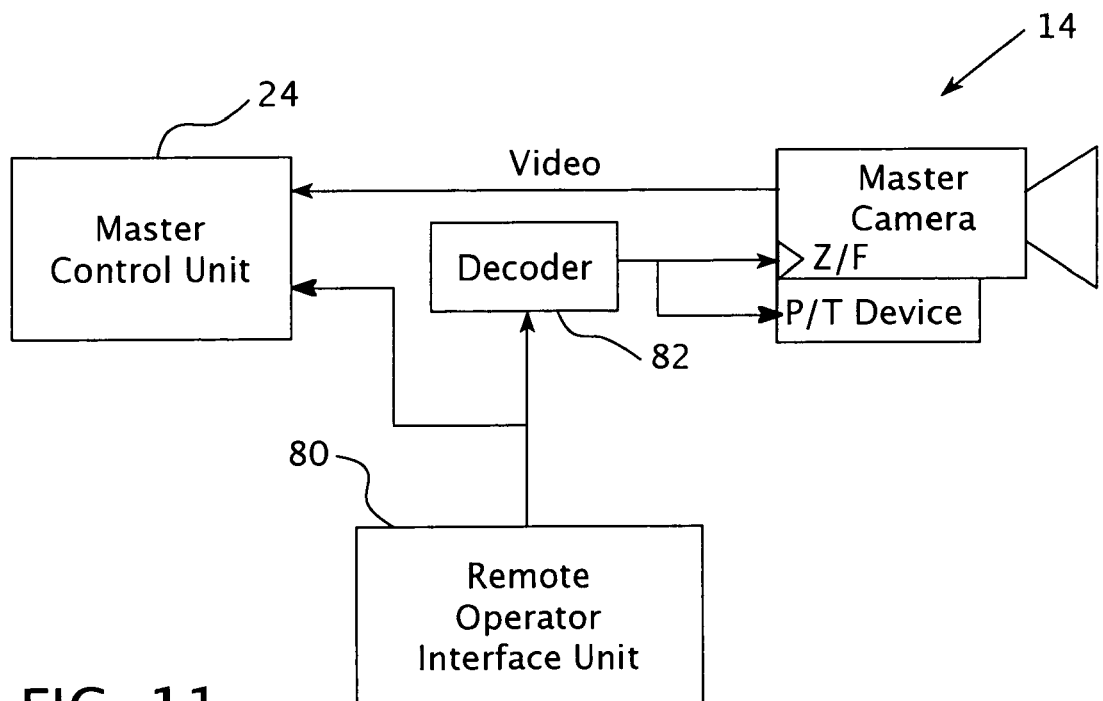
FIG. 11 is a diagram illustrating a portion of the system of FIGS. 6 and 7 according to another embodiment of the present invention.

For an embodiment in which the operator of the master camera system 14 is a human operator, i.e., a "cameraman," the cameraman may control the pan, tilt, zoom and focus of the master camera system 14 remotely through a remote operator interface unit 80, as illustrated in FIG. 11. The remote operator interface unit 80 may be implemented as a computing device such as, for example, a personal computer, a laptop computer or a workstation, providing a graphical user interface to allow the cameraman to specify the pan, tilt, zoom and focus parameter for the master camera system 14. A decoder 82 may decode these parameters for use by the master camera system 14. These parameters may also be input to the master control unit 24, either directly from the user interface, as illustrated in FIG. 11, or as feedback from the master camera system after it has executed a movement, as shown in FIG. 7.

Figure 12:
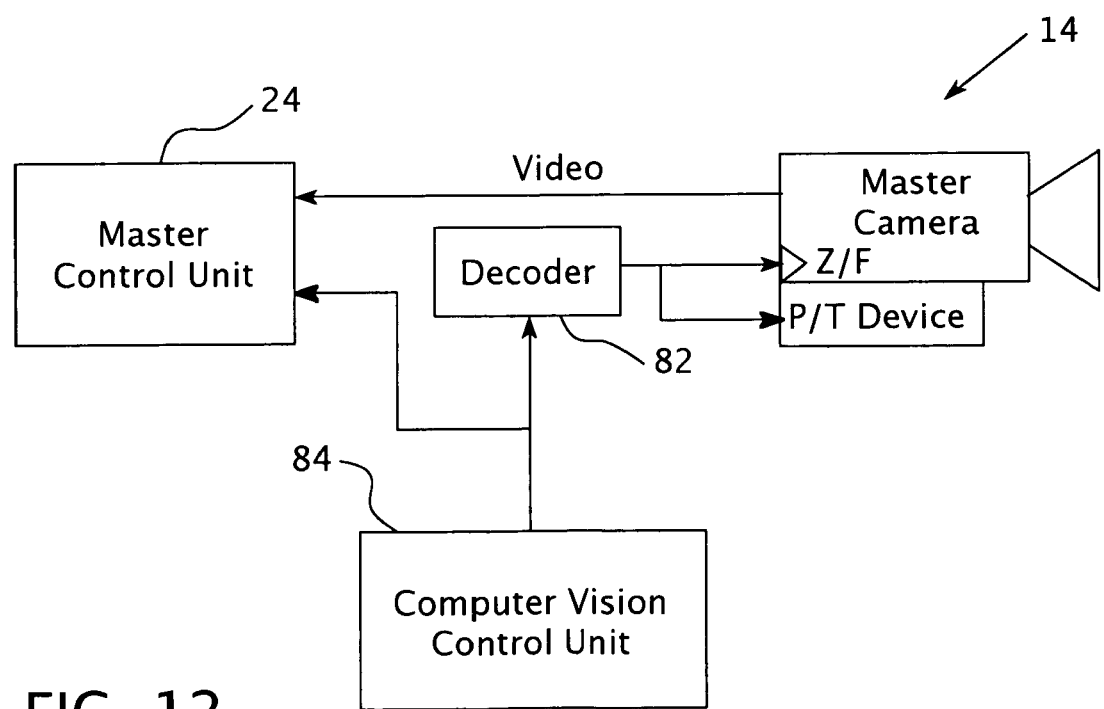
FIG. 12 is a diagram illustrating a portion of the system of FIGS. 6 and 7 according to another embodiment of the present invention.

As described previously, the operator of the master camera system 14 may also be a computer vision application. FIG. 12 is a diagram of a portion of the system 10 according to such an embodiment. As illustrated in FIG. 12, the system 10 includes a computer vision control unit 84 for controlling the master camera system 14. The computer vision control unit 84 may be inplemented as a computing device such as, for example, a personal computer, a laptop computer or a workstation, configured with computer vision software that when executed by the computer vision control unit automatically detects and tracks moving objects in the scene 12 by processing video from the master camera system 14. According to another embodiment, the computer vision control unit 84 may receive the video from and be in communication with each camera system 14, 16, and may automatically select a different camera system to be the master computer system to decrease the distance to, or increase the visibility of, an object being tracked by the computer vision control unit 84.

Figure 13:
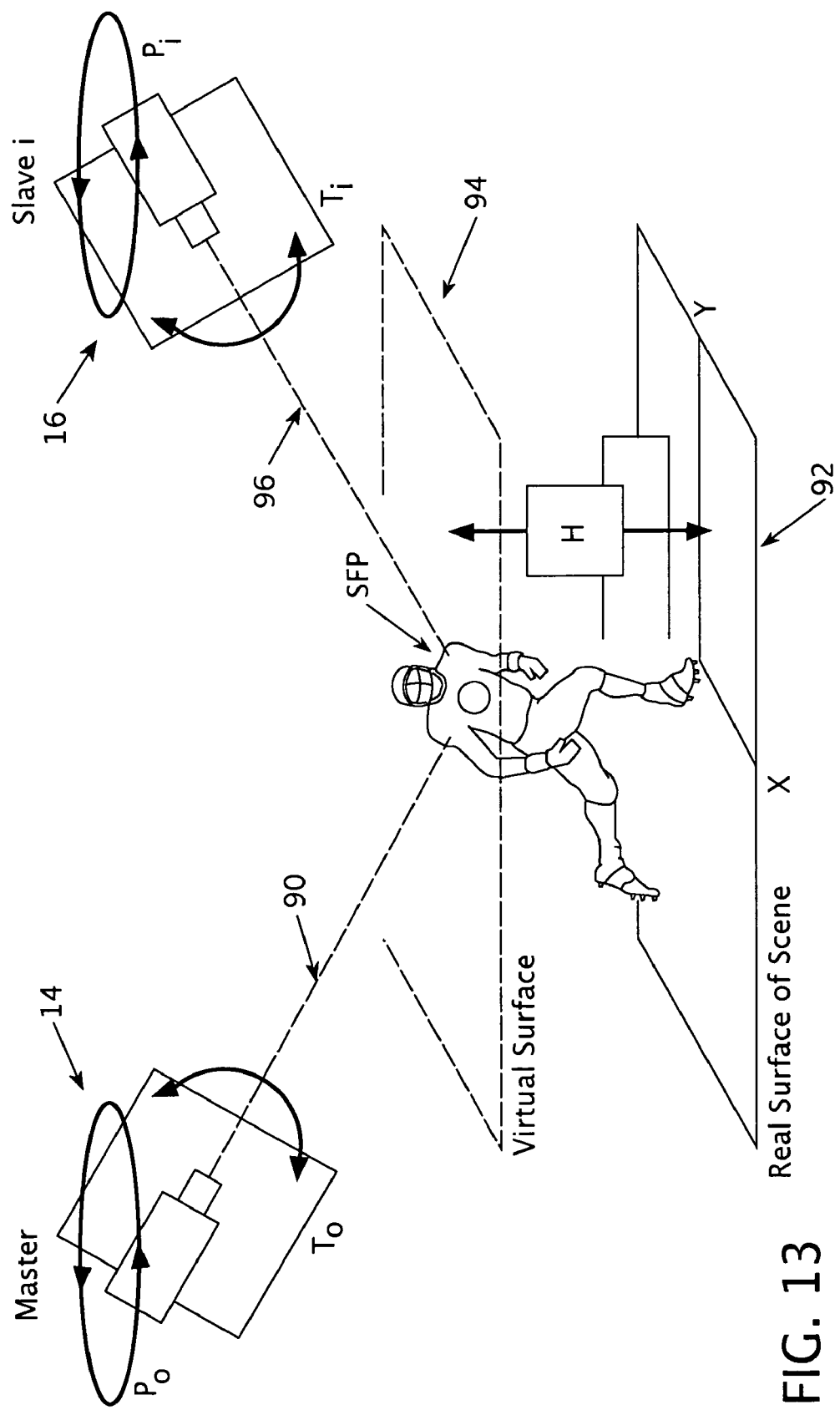
FIG. 13 is a diagram illustrating the relationship between the principal viewing ray of the master camera system and the servo fixation point (SFP) according to one embodiment of the present invention.

With reference to FIG. 13, based on the pan/tilt angle parameters from the master camera system 14, the master control unit 24 may determine the equation of a 3D line specifying the principal-viewing ray 90 of the master camera system 14. All points on this line can be represented as $\vec{p} = \vec{c} + k\vec{v}$, where $\vec{p}$ is a 3D point on the line, $\vec{c}$ is th master camera system, $\vec{v}$ is a unit vector representing the orientation of the principal axis, directed out from the focal point, and k is a scalar parameter that selects different points on the line. Only points on the line that are in front of the focal point (i.e., k>0) are considered to be on the master camera system principal viewing ray 90.

The desired servo-fixation point (SFP) for the spin-image effect is defined to be some point on the principal viewing ray 90 of the master camera system 14. Choosing which point is the SFP is equivalent to choosing a value for parameter k in the above line equation. The SFP may be determined by specifying k directly through a user interface such as, for example, the video reviewer interface 62 or the remote operator interface unit 80. Note that k represents the distance or range of the desired SFP from the master camera system 14. It may be selected using a one-degree of freedom mechanism, by the cameraman or a second operator. According to one embodiment, the SFP may be determined by intersecting the principal-viewing ray 90 with an equation or set of equations representing a real surface of the scene 92. For example, the real surface of the scene 92 may be approximately represented by the equation of a plane. Alternatively, a more accurate approximation may be to represent the field by a nonplanar, triangulated mesh, or an explicit nonplanar surface equation.

Similarly, the SFP may be determined by intersecting the principal-viewing ray 90 with an equation or set of equations representing a virtual (nonphysical) surface 94 in the scene. For example, it may be desirable to intersect the viewing ray 90 with a virtual surface 94 located a certain distance H, e.g. four feet, above the real surface of the scene 92. According to another embodiment, the SFP may be determined by intersecting the principal-viewing ray 90 with a set composed of any arbitrary combination real and virtual surfaces in the scene, for example the floor, walls and ceiling of a room.

If the SFP is determined by intersecting the principal-viewing ray 90 with a surface or set of surfaces. Because there is more than one mathematical intersection point, various methods may be used to determine which point is the desired SFP. One such method is to always choose the intersection point that is closest to the master camera system 14. If there is no mathematical intersection point, an alternate method must be used to determine the SFP. One example is to use the last known valid point of intersection.

For each slave camera system, the 3D position of the SFP is used to compute the pan and tilt angle parameters that bring the slave camera system principal-viewing ray 96 into alignment with the SFP. These values are used to command the pan/tilt device 20 of the respective slave camera systems 16 to move. After this movement, the SFP may appear in the center of the camera image.

The distance d between a slave camera system position $\vec{c}$ and SFP $\vec{x}$ may be computed. Let vector $(a,b,c) = \vec{x} - \vec{c}$. Then d may be computed as $d = \sqrt{a^2+b^2+c^2}$.

The zoom of each slave camera system 16 may be controlled to keep the object of interest (a person, for example) substantially the same size in all the images (such as within error margins caused by servoing errors and misalignment), even though the slave camera systems 16 may be different distances away from the object. Let r be the desired radius of a virtual sphere subtending the entire vertical field of view of each image. Let $d_i$ be the distance from slave camera system $16_i$ to the SFP. The desired vertical field of view angle $\alpha_i$ can be computed as $\alpha_i = 2*\arctan(r/d_i)$. The zoom parameter that achieves this desired field of view is then computed by the servo control module $44_i$ from data collected during the prior zoom camera calibration procedure.

The focus of each slave camera system 16 may be controlled to achieve sharp focus at the SFP. The focus parameter that achieves sharp focus at distance $d_i$ may be computed for slave camera system $16_i$ using the distance versus focus parameters equations or tables derived from the prior focus camera calibration procedure.

According to another embodiment, in order to achieve smooth motion, each servo control module 44 of the slave camera control units 26 may have to command the pan/tilt device 20 of the slave camera systems 16 as well as the camera/lens systems thereof at an even higher rate than it is receiving commands from the slave control module 43 of the master control unit. This may be achieved by interpolating between the last-received command and the current command, thereby controlling the pan, tilt, zoom and focus in smaller increments, more frequently.

As mentioned previously, the frame-sequencing module 64 may allow an operator to select, for example, the point of interest (POI), the vertical unit point V1, and/or the translation point C0 for the sequence of images used in the image sequence. These points may be selected, for example, to correct for misalignment errors in the camera systems and/or select a POI that is different than the object on which the camera systems are servoing.

Figure 14:
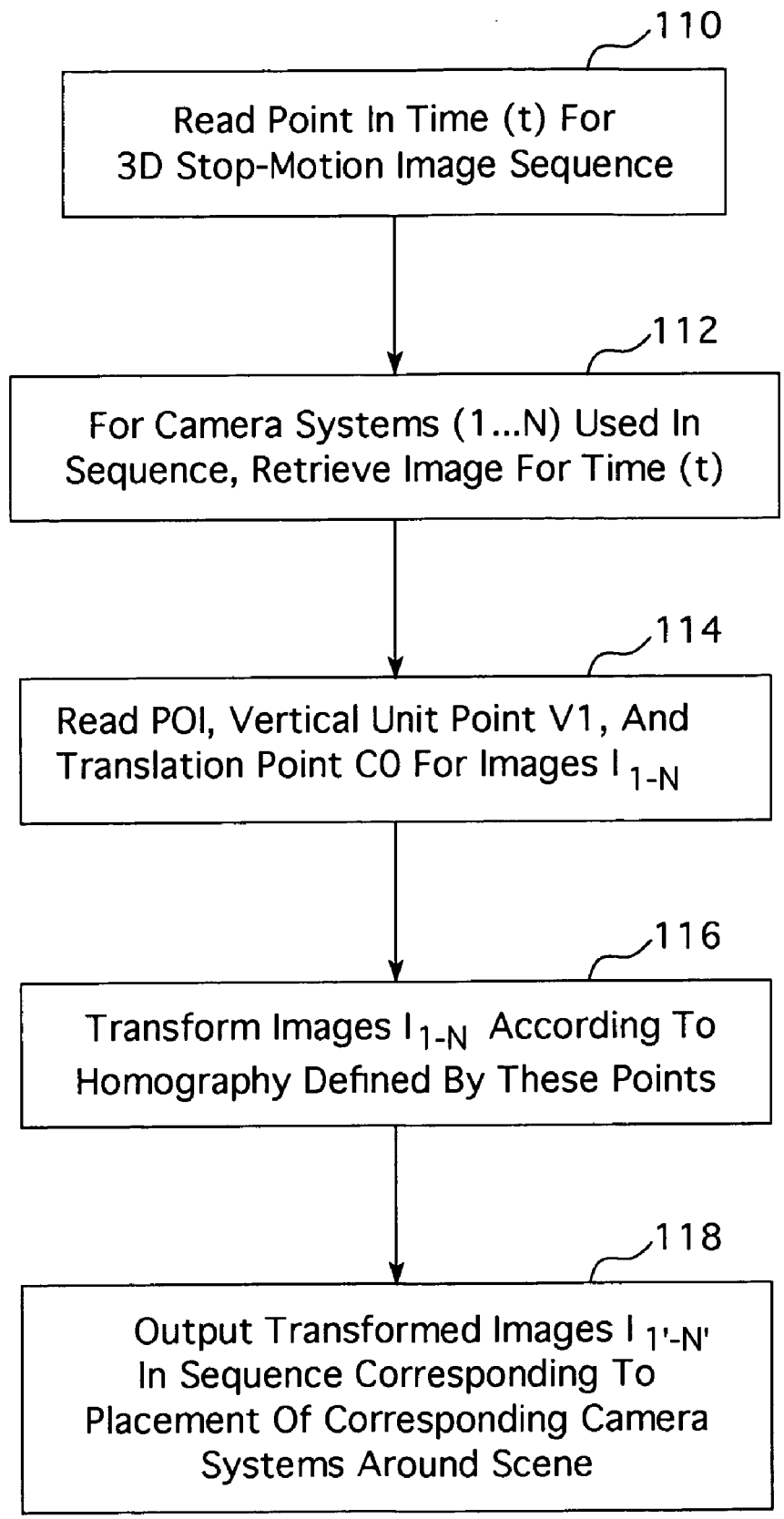
FIG. 14 is a diagram illustrating the process flow through the image sequence generator according to one embodiment of the present invention.

FIG. 14 is a diagram of a process flow through the image sequence generator 60 according to one embodiment in which the POI, the vertical unit point V1, and the translation point C0 are specified for each image of the sequence to, for example, simulate the effects of changing yaw, pitch, roll and translation Tz along the cameras' central viewing rays. For purposes of illustration, the process flow illustrated in FIG. 14 is for the generation of a 3D stop-motion image sequence in which all of the displayed images are from the same instant in time (t). According to other embodiments, however, as explained previously, the image sequence generator 60 may also output images from different time steps.

The process illustrated in FIG. 14 initiates at block 110 where the image sequence generator 60 reads the time (t) for which the 3D stop-motion image sequence is to be generated. As described previously, the video reviewer may specify this instant in time through the video reviewer interface module 62. Next, at block 112 the frame-sequencing module 64 may retrieve from the video storage units 30 the image (images $I_{1-N}$) for all of the camera systems 14, 16 to be used in the sequence, which may also be specified through the video reviewer interface module 62 and may be all or less than all of the camera systems.

At block 114, the image sequence generator 60 may read the POI, the vertical unit point V1 and the translation point C0 for each image $I_{1-N}$. As described previously, an operator may enter the point for each image $I_{1-N}$ through the video reviewer interface module 62 such as by, for example, clicking on the point in the image with a mouse or stylus. According to another embodiment, the operator may enter a character string corresponding to the coordinates of the respective points for each image $I_{1-N}$ through the video reviewer interface module 62.

At block 116, the frame-sequencing module 64 transforms the images $I_{1-N}$ according to the homography defined by the POI, the V1, and the C0. That is, as described previously, the POI may be mapped to the point C0, and the vertical unit point V1 may be mapped to one vertical unit above C0. Next, at block 118, the frame-sequencing module 64 may output the transformed images $I_{1'-N'}$ in sequence corresponding to the order of the placement of the corresponding camera systems 14, 16 around the scene 12, either clockwise or counter-clockwise, to generate the video image sequence.

When the video systems 14, 16 are mounted only sparsely along the specified gross trajectory, a sequence of frames retrieved spatially and played back will appear discrete and discontinuous as the views jump from one camera location to the next. To overcome this effect, the frame-sequencing module 64 may also generate new ("virtual") video images to "fill in" between the image frames from existing views to, for example, produce a new video image sequence that appears to be smoother and more continuous. The new video images may be generated using induced camera motion, as described previously, to "interpolate" camera positions between the actual camera system locations. For example, according to one embodiment, a sequence of new images may be generated that smoothly varies the rotation and translation from one camera viewpoint into another, resulting in an apparent smooth motion of a single camera from the first position into the second.

Although the present invention has been described herein with respect to certain embodiments, those of ordinary skill in the art will recognize that many modifications and variations of the present invention may be implemented. For example, rather than employing a distributed architecture, the master control unit 24 and the slave camera control units 26 may be integrated into one computer device. According to such an embodiment, the master control unit 24 may therefore further include a servo control module 44 for computing the PTZF commands for each slave camera system 16.

According to one embodiment, the image sequence generator 60 may be integrated with the computing device of the master control unit 24, as may the remote operator interface unit 80 or the computer vision control unit 84. According to another embodiment, the image sequence generator 60 may be distributed across more than one computing device. In addition, according to another embodiment, the slave control module 43 may be distributed among the slave camera control units 26. According to such an embodiment, the appropriate master/slave mapping data may be stored in a memory unit of the slave camera control units 26.

According to another embodiment, one may chose to make one of the slave camera systems 16 the master camera system. Accordingly, the original master camera system 14 would then be under the control of one of the slave camera control units 26. This may be realized, for example, by connecting each of the camera systems 14, 16 to a network such that each camera system 14, 16 is in communication with the master control unit 24 and at least one slave camera control unit.

According to another embodiment, the system 10 may include a plurality of master camera systems 14, each one controlling a subset of the slave camera systems 16. According to such an embodiment, the system 10 may include a plurality of master control units 24, one for each master camera system 14. According to one embodiment, each of the master control units 24 may be centralized in one computing device.

The foregoing description and the following claims are intended to cover all such modifications and variations.

What is claimed is:

1. A method of generating a video image sequence, comprising:
positioning a plurality camera systems relative to a scene such that the camera systems define a gross trajectory;
capturing images with the camera systems using parameters from a first of the camera systems and mapping data for the camera systems to compute parameters for the remainder of the camera systems;
applying a 2D projective image transformation to certain captured images from the camera systems to superimpose a secondary induced motion on the gross trajectory, wherein the image transformation is done independently of the three-dimensional structure of the scene; and
displaying the transformed images in sequence corresponding to the position of the corresponding camera systems along the gross trajectory,
wherein the mapping data includes:
data regarding the geometric relationship of the camera systems to the scene;
data regarding the relationship between the zoom and the angular field of view for each camera system; and
data regarding the relationship between the focus and the depth of field for each camera system.

2. The method of claim 1, wherein positioning the plurality of camera systems includes positioning a plurality of pan/tilt camera systems relative to the scene.

3. The method of claim 1, wherein positioning the plurality of camera systems includes positioning a plurality of static camera systems relative to the scene.

4. The method of claim 1, wherein positioning the plurality of camera systems includes positioning at least one pan/tilt camera system and one static camera system relative to the scene.

5. The method of claim 1, wherein applying the 2D image transformation includes applying a 2D image transformation according to a homography defined by a one point correspondence between the images.

6. The method of claim 5, wherein applying the 2D image transformation according to a homography defined by a one point correspondence between the images includes mapping a point of interest in each image to the center of the image.

7. The method of claim 1, wherein applying the 2D image transformation includes applying a 2D image transformation according to a homography defined by a two point correspondence between the images.

8. The method of claim 7, wherein applying the 2D image transformation according to a homography defined by a two point correspondence between the images includes:
mapping a point of interest in each image to the center of the image; and mapping a vertical unit point in each image to a point at a predetermined vertical relationship to the center of the image.

9. The method of claim 1, wherein applying the 2D image transformation includes applying a 2D image transformation according to a homography defined by a three point correspondence between the images.

10. The method of claim 9, wherein applying the 2D image transformation according to a homography defined by a three point correspondence between the images includes:
mapping a translation point in each image to the center of the image;
mapping a point of interest in each image to the translation point in each image; and
mapping a vertical unit point in each image to a point at a predetermined vertical relationship to the translation point.

11. The method of claim 1, further comprising:
generating an image corresponding to an image from a virtual camera system positioned along the gross trajectory between first and second camera systems of the plurality of camera systems; and
displaying the image between display of the transformed image from the first camera system and display of the transformed image from the second camera system.

12. The method of claim 11, wherein generating the image corresponding to an image from a virtual camera system positioned along the gross trajectory between first and second camera systems of the plurality of camera systems includes generating an image corresponding to an image from a virtual camera system having a rotation and translation interpolated from a rotation and translation of the first and second camera systems.

13. The method of claim 1, wherein positioning the plurality of camera systems relative to the scene includes positioning the plurality of camera systems in a close-ended configuration relative to the scene.

14. The method of claim 1, wherein positioning the plurality of camera systems relative to the scene includes positioning the plurality of camera systems in an array configuration.

15. A system for generating a video image sequence of an object within a scene, comprising:
means for capturing an image from a plurality of camera systems positioned relative to the scene such that the camera systems define a gross trajectory, wherein parameters from a first of the camera systems and mapping data for the camera systems are used to compute parameters for the remainder of the camera systems; and
means for 2D projective image transforming certain captured images from the camera systems to superimpose a secondary induced motion on the gross trajectory, wherein the image transformation is done independently of the three-dimensional structure of the scene, wherein the mapping data includes:
data regarding the geometric relationship of the camera systems to the scene;
data regarding the relationship between the zoom and the angular field of view for each camera system; and
data regarding the relationship between the focus and the depth of field for each camera system.

16. The system of claim 15, further comprising means for controlling the plurality of camera systems such that the camera systems are simultaneously aimed at a target within the scene and a size of the target in the images from the camera systems is substantially the same over time.

17. The system of claim 16, further comprising means for outputting the transformed images in sequence corresponding to the position of the corresponding camera systems along the gross trajectory.

18. The system of claim 15, wherein the means for applying the 2D image transformation includes means for applying a 2D image transformation according to a homography defined by a one-point correspondence between the images.

19. The system of claim 18, wherein the means for applying the 2D image transformation according to a homography defined by a one point correspondence between the images includes means for mapping a point of interest in each image to the center of the image.

20. The system of claim 19, wherein the point of interest is not a point of the target.

21. The system of claim 19, wherein the point of interest is a point of the target.

22. The system of claim 15, wherein the means for applying the 2D image transformation includes applying a 2D image transformation according to a homography defined by a two-point correspondence between the images.

23. The system of claim 22, wherein the means for applying the 2D image transformation according to a homography defined by a two-point correspondence between the images includes:
means for mapping a point of interest in each image to the center of the image; and
means for mapping a vertical unit point in each image to a point at a predetermined vertical relationship to the center of the image.

24. The system of claim 15, wherein the means for applying the 2D image transformation includes means for applying a 2D image transformation according to a homography defined by a three-point correspondence between the images.

25. The system of claim 24, wherein the means for applying the 2D image transformation according to a homography defined by a three-point correspondence between the images includes:
means for mapping a translation point in each image to the center of the image;
means for mapping a point of interest in each image to the translation point in each image; and
means for mapping a vertical unit point in each image to a point at a predetermined vertical relationship to the translation point.

26. The system of claim 15, further comprising:
means for generating an image corresponding to an image from a virtual camera system positioned along the gross trajectory between first and second camera systems of the plurality of camera systems; and
means for outputting the image between display of the transformed image from the first camera system and display of the transformed image from the second camera system.

27. The system of claim 26, wherein the means for generating the image corresponding to an image from a virtual camera system positioned along the gross trajectory between first and second camera systems of the plurality of camera systems includes means for generating an image corresponding to an image from a virtual camera system having a rotation and translation interpolated from a rotation and translation of the first and second camera systems.

28. A system for generating a video image sequence of an object within a scene, comprising:

a plurality of camera systems positioned relative to the scene such that the camera systems define a gross trajectory;

a video storage unit in communication with the camera systems for storing images captured by the camera systems, wherein parameters from a first of the camera systems and mapping data for the camera systems are used to compute parameters for the remainder of the camera systems; and a frame-sequencing module in communication with the video storage unit for applying a 2D projective transformation to certain of the captured images of the camera systems retrieved from the video storage unit to superimpose a secondary induced motion on the gross trajectory, wherein the image transformation is done independently of the three-dimensional structure of the scenes, wherein the mapping data includes:
  data regarding the geometric relationship of the camera systems to the scene;
  data regarding the relationship between the zoom and the angular field of view for each camera system; and
  data regarding the relationship between the focus and the depth of field for each camera system.

29. The system of claim 28, further comprising means for controlling the plurality of camera systems such that the camera systems are simultaneously aimed a target within the scene and a size of the target in the images from the camera systems is substantially the same over time.

30. The system of claim 29, wherein the frame-sequencing module is further for outputting the transformed images in sequence corresponding to the position of the corresponding camera systems along the gross trajectory.

31. The system of claim 30, wherein the frame-sequencing module is further for:
  generating an image corresponding to an image from a virtual camera system positioned along the gross trajectory between first and second camera systems of the plurality of camera systems; and
  outputting the image between display of the transformed image from the first camera system and display of the transformed image from the second camera system.

32. The system of claim 31, wherein the frame-sequencing module is for generating the image corresponding to an image from a virtual camera system positioned along the gross trajectory between first and second camera systems of the plurality of camera systems by generating an image corresponding to an image from a virtual camera system having a rotation and translation interpolated from a rotation and translation of the first and second camera systems.

33. The system of claim 28, wherein the 2D image transformation includes a 2D image transformation according to a homography defined by a one-point correspondence between the images.

34. The system of claim 33, wherein frame-sequencing module is for applying the 2D image transformation according to a homography defined by a one point correspondence between the images includes by mapping a point of interest in each image to the center of the image.

35. The system of claim 34, wherein the point of interest is not a point of the target.

36. The system of claim 34, wherein the point of interest is a point of the target.

37. The system of claim 28, wherein the 2D image transformation includes a 2D image transformation according to a homography defined by a two-point correspondence between the images.

38. The system of claim 37, wherein the frame-sequencing module is for applying the 2D image transformation according to a homography defined by a two-point correspondence between the images by:
  mapping a point of interest in each image to the center of the image; and
  mapping a vertical unit point in each image to a point at a predetermined vertical relationship to the center of the image.

39. The system of claim 28, wherein the 2D image transformation includes a 2D image transformation according to a homography defined by a three-point correspondence between the images.

40. The system of claim 39, wherein the frame-sequencing module is for applying the 2D image transformation according to a homography defined by a three-point correspondence between the images by:
  mapping a translation point in each image to the center of the image;
  mapping a point of interest in each image to the translation point in each image; and
  mapping a vertical unit point in each image to a point at a predetermined vertical relationship to the translation point.

41. A computer readable medium, having stored thereon instructions which, when executed by a processor, cause the processor to:
  compute parameters for a plurality of camera systems based on the parameters for one of the camera systems and based on mapping data for the camera systems, wherein the camera systems are positioned relative to a scene to define a gross trajectory to superimpose a secondary induced motion on the gross trajectory;
  apply a 2D projective transformation to certain images captured by a plurality of camera systems positioned relative to a scene to define a gross trajectory to superimpose a secondary induced motion on the gross trajectory, wherein the image transformation is done independently of the three-dimensional structure of the scene; and
  output the transformed images in sequence corresponding to the position of the corresponding camera systems along the gross trajectory,
  wherein the mapping data includes:
    data regarding the geometric relationship of the camera systems to the scene;
    data regarding the relationship between the zoom and the angular field of view for each camera system; and
    data regarding the relationship between the focus and the depth of field for each camera system.

42. The computer readable medium of claim 41, having further stored thereon instructions which, when executed by the processor, cause the processor to apply the 2D image transformation by applying a 2D image transformation according to a homography defined by a one point correspondence between the images.

43. The computer readable medium of claim 42, having further stored thereon instructions which, when executed by the processor, cause the processor to apply the 2D image transformation according to a homography defined by a one point correspondence between the images by mapping a point of interest in each image to the center of the image.

44. The computer readable medium of claim 41, having further stored thereon instructions which, when executed by the processor, cause the processor to apply the 2D image transformation by applying a 2D image transformation according to a homography defined by a two point correspondence between the images.

45. The computer readable medium of claim 44, having further stored thereon instructions which, when executed by the processor, cause the processor to apply the 2D image transformation according to a homography defined by a two point correspondence between the images by
mapping a point of interest in each image to the center of the image; and
mapping a vertical unit point in each image to a point at a predetermined vertical relationship to the center of the image.

46. The computer readable medium of claim 41, having further stored thereon instructions which, when executed by the processor, cause the processor to apply the 2D image transformation includes applying a 2D image transformation according to a homography defined by a three point correspondence between the images.

47. The computer readable medium of claim 46, having further stored thereon instructions which, when executed by the processor, cause the processor to apply the 2D image transformation according to a homography defined by a three point correspondence between the images by:
mapping a translation point in each image to the center of the image;
mapping a point of interest in each image to the translation point in each image; and
mapping a vertical unit point in each image to a point at a predetermined vertical relationship to the translation point.

48. The computer readable medium of claim 41, having further stored thereon instructions which, when executed by the processor, cause the processor to:
generate an image corresponding to an image from a virtual camera system positioned along the gross trajectory between first and second camera systems of the plurality of camera systems; and
display the image between display of the transformed image from the first camera system and display of the transformed image from the second camera system.

49. The computer readable medium of claim 48, having further stored thereon instructions which, when executed by the processor, cause the processor to generate the image corresponding to an image from a virtual camera system positioned along the gross trajectory between first and second camera systems of the plurality of camera systems by generating an image corresponding to an image from a virtual camera system having a rotation and translation interpolated from a rotation and translation of the first and second camera systems.

* * * * *